Patented Aug. 17, 1943

2,327,007

UNITED STATES PATENT OFFICE 2,327,007

PLASTICIZED RESINS AND PREPARATION THEREOF

Franklin A. Bent, Berkeley, and Francis G. Byrne, Oakland, Calif., assignors to Shell Development Company, San Francisco, Calif., a corporation of Delaware No Drawing. Application December 30, 1939, Serial No. 311,814

8 Claims. (Cl. 106—187)

This invention relates to plasticized resin compositions containing a ketone-soluble synthetic or natural resin and a novel plasticizer, and to a new method of plasticizing synthetic and natural resins.

Many natural and synthetic resins are inherently hard and brittle so that, when they are used for molding purposes and in coating compositions, the products and films crack and peel because of their lack of flexibility. By incorporating with the resins a substance which acts as a plasticizer, the resulting compositions have flexibility and toughness permitting their use in numerous applications where the unplasticized resins would be totally unsuited.

It is an object of the present invention to provide new resin compositions having a high degree of flexibility. Another object of the invention is to provide resin compositions plasticized with a substance which may be easily produced from readily available raw materials. A further object is to provide a new method of plasticizing resins. A still further object of our invention is to provide a method of plasticizing a variety of both natural and synthetic resins.

We have found that natural and synthetic resins which are soluble in ketones may be plasticized with substantially saturated ketones having at least 12 carbon atoms and preferably at least 18 carbon atoms per molecule. Such suitable ketones may be obtained by condensing a lower ketone with a ketone or an aldehyde and subsequently hydrogenating the condensation product. Ketones of this character are compatible with the resins so that the compositions are homogeneous, and the ketones, especially those containing at least 18 carbon atoms per molecule, are substantially non-volatile which enables them to remain in the resin compositions for the useful life thereof. Furthermore, the ketones are substantially colorless, light stable, odorless and tasteless substances which may be manufactured from raw materials easily obtainable.

Preparation of the higher ketones may be conveniently accomplished by condensing a lower ketone with itself, a dissimilar ketone, or an aldehyde under suitable conditions whereby the products are unsaturated ketones of the desired number of carbon atoms. The unsaturated ketones obtained by the condensation reactions are not, however, attractive for use as plasticizers owing to their poor color and tendency to dry to hard brittle resins. By subjecting the condensation products to hydrogenation, the unsaturated ketones may be converted to the desired substantially saturated ketones.

Condensation of a lower ketone with itself, a dissimilar ketone, or with an aldehyde to form higher molecular weight unsaturated ketones may be done by conducting the reaction so as to favor crotonaldehyde type of condensation to the exclusion of aldol type of condensation. While this may be realized by employing strong mineral acids such as sulfuric acid, hydrochloric acid and the like as condensation catalysts, it is usually preferable to use strong mineral bases such as sodium hydroxide, potassium hydroxide and the like. Concentrated aqueous solutions of the bases are excellent catalysts. By using concentrated solutions of the catalyst, removing the water from the reaction as fast as formed in order to maintain the catalyst concentration constant, controlling the contact time of the reactants with the catalyst, and controlling the temperature of reaction, a number of molecules of the reactants may be combined to give a high yield of unsaturated ketones with the desired number of carbon atoms.

The ketones used as starting materials may be either saturated or unsaturated compounds. Among others, the suitable ketones include acetone, methyl ethyl ketone, methyl propyl ketone, diethyl ketone, methyl butyl ketone, methyl isobutyl ketone, methyl vinyl ketone, methyl isopropenyl ketone, mesityl oxide, cyclopentanone, cyclohexanone, etc. The ketones may be made to undergo self-condensation by employing only a single reactant in the reaction mixture or they may be condensed with other ketones when two or more ketones are present in the reaction mixture. In addition to the ketones, the reaction mixture may contain one or more aldehydes. Suitable aldehydes which may be employed include acetaldehyde, propionaldehyde, butyraldehyde, isobutyraldehyde, ethyl hexaldehyde, acrolein, crotonaldehyde, methacrolein, ethyl propyl acrolein and the like. Of the various ketones and aldehydes which may be reacted, the products obtained by self-condensation of mesityl oxide are particularly suitable and this compound is therefore a preferred reactant. This compound is readily available and gives good yields of the desired unsaturated ketones. Upon completion of the condensation reaction, the products may be separated from the catalyst in any suitable manner such as, for example, by washing with water and with a neutralization agent. The products may then be separated from the unreacted material and into fractions of suitable molecular weight by distillation or, if desired, the product may be hydrogenated without separation or with only partial separation. The condensation products are branched chain unsaturated ketones which may contain cyclic arrangements of carbon atoms; this structure being retained upon conversion of the products to substantially saturated ketones.

The unsaturated ketones are catalytically hydrogenated, preferably in the liquid phase, to form the plasticizer. This may be done by subjecting the unsaturated ketones to the action of hydrogen in the presence of a hydrogenation catalyst. Representative substances which may be employed alone or in admixture with each other as well as other substances, as catalysts are nickel, cobalt, iron, copper, palladium, platinum, silver, and the like. If desired, the catalyst may contain one or more promoters or activators such as oxides of cerium, thorium or chromium. It may also be desirable to mount the catalyst on a carrier such as active carbon, activated alumina, kieselguhr, silica gel or the like. Nickel is a preferred catalyst, however, and a nickel catalyst prepared as described by Raney in U. S. Patent No. 1,628,190 is particularly suitable.

The substantially saturated ketones may be obtained by hydrogenating the unsaturated ketones under mild conditions whereby the ethylenic bonds of the unsaturated ketones are saturated with hydrogen, but reduction of the carbonyl group to a carbinol group does not occur to an appreciable extent. Temperatures from ordinary room temperature to about 125° C. and pressures of from about 100 to 1,000 pounds per square inch may be used. An alternative method may also be used in which the unsaturated ketones are hydrogenated under more severe conditions, such as at temperatures up to 250° C. and pressures up to about 3,000 pounds per square inch, so that, besides saturating the condensation products, considerable or complete reduction of the carbonyl group will occur. The material from this operation may then be heated at elevated temperatures up to 250° C. under substantially lower pressures such as atmospheric pressure in the presence of the hydrogenation catalyst whereby dehydrogenation of the alcohols to ketones will occur. The catalyst may be separated from the hydrogenation products by any suitable manner such as filtration, centrifugation, distillation, and the like.

The hydrogenation catalysts are in general quite sensitive to the presence of impurities such as sulfur and halogens and it is therefore desirable to avoid contamination of the unsaturated ketones with impurities of this character. If appreciable amounts of catalyst poisons are present in the materials hydrogenated, the activity of the catalyst will be greatly reduced or destroyed.

A certain amount of alcohols may be present in the hydrogenation products which it may be desired to remove from the ketones. In some cases, the alcohols may be separated by careful fractionation of the products. In general, however, the high molecular weight products containing the same number of carbon atoms obtained by the condensation and hydrogenation operations are a mixture of isomers with different boiling points. This feature of the products coupled with the close proximity of the boiling points of the ketones and their corresponding alcohols usually makes fractionation a difficult method for separation of the ketones and alcohols. The ketones may be separated by other methods however, such as by esterifying the alcohols with suitable acids which will give products having boiling points sufficiently different from the ketones that the ketones may be distilled from the products and obtained in a substantially pure condition. Another method is to contact the hydrogenated condensation products with a dehydration catalyst such as alumina or pumice so that the alcohols will be dehydrated to olefines. The ketones will not be affected by such an operation and the resulting olefines may then be removed from the ketones by distillation, for example.

According to the invention, ketone-soluble synthetic plastics are plasticized by intimately mixing the resins with substantially saturated ketones containing at least 12 carbon atoms per molecule. By the expression "ketone-soluble synthetic plastics" reference is made to those synthetic plastics which are soluble in the lower aliphatic ketones. A large variety of types of ketone-soluble synthetic plastics may be plasticized by the method of the present invention. Among the suitable synthetic plastics there may be mentioned nitrocellulose; vinyl ester resins including both organic and inorganic esters such as polyvinyl chloride, polyvinyl bromide, polyvinyl acetate, interpolymers of vinyl chloride and vinyl acetate; polyvinyl acetals including those made from various aldehydes such as formaldehyde, acetaldehyde, butyraldehyde, etc.; acrylate resins such as polymerized esters of acrylic acid; methacrylate resins such as polymerized esters of methacrylic acid; cellulose ethers such as ethyl cellulose, methyl cellulose, benzoyl cellulose, etc.; halogenated rubber such as chlorinated rubber, brominated rubber, etc.; rubber condensation derivatives such as the resins obtained by treating rubber with chlorostannic acid, for example; ketone-soluble modified phenolic resins such as the amberol-type resins; alkyd resins such as glyptal-type resins; paracumarone indene resins; ester gum; and the like. Ketones containing at least 12 carbon atoms per molecule may also be employed to plasticize many types of ketone-soluble natural resins. Ketone-soluble natural resins which are suitable include kauri gums, manila loba, manila melengket, pontianak, boea, singapore manila, sandarac, damar, acaroid, gum mastic, and the like. Thus a wide variety of resins of various types may be plasticized according to the method of the invention.

The plasticized compositions of the invention are prepared by incorporating the ketones with the resins and intimately mixing them therewith so as to obtain a homogeneous mixture. The mixing of the ketones with the resins may be done in any of the conventional manners. The plasticizer may be worked into the resin on a heated roll-mill or the resin may be heated to render it soft and the plasticizer mixed in by manual kneading or mechanical agitation. If desired, the mixing may be done in the presence of a mutual solvent for the resin and the plasticizer. This method is particularly suited for application of the plasticized resin compositions as surface coatings. The resin may be dissolved along with the plasticizer in the solvent or solvents and any other ingredient required may be dissolved or dispersed to form the coating composition. After application of the coating composition to a surface and evaporation of the liquid vehicle, the plasticized resin composition will remain. In some cases it may be desirable to bake the films formed from the coating composition. With resins which are obtained by polymerization, the ketone plasticizer may be mixed with the monomeric substances and these may be polymerized to yield resin compositions containing the plasticizer.

The properties desired in the finished products made from the plasticized resin composition determines largely the proportion of plasticizer which is incorporated with the resin. In general, the larger the proportion of plasticizer contained in the composition, the more flexible will be the plasticized resin. If the composition is employed in the form of a film and as a surface coating, it may be advantageous to use a larger proportion of plasticizer in the compositions than when molded articles are prepared. Thus in some cases, a few percent of plasticizer will be sufficient to give the properties desired while in others one part or even more of plasticizer per part of resin may be required.

The proportion of plasticizer is also dependent upon the properties of the particular resin which is plasticized. Some resins are very brittle and require higher proportions of plasticizer than others which are naturally more flexible. For example, certain of the acrylate and methacrylate resins are not inherently brittle and may be plasticized with relatively small proportions of ketone. On the other hand, rubber condensation derivatives prepared by the action of chlorostannic acid on rubber which are known to the trade as Pliolite are extremely brittle and subject to cracking in an unplasticized condition. Resins of the latter type may require quite a large proportion of ketone to give satisfactory compositions.

The ketone plasticizer employed in the resin compositions contains at least 12 and preferably at least 18 carbon atoms per molecule. Ketones which are particularly suited are those containing 18 to 24 carbon atoms although ketones with more than 24 carbon atoms are also quite satisfactory. Ketones containing 12 to 18 carbon atoms may sometimes be employed as a high boiling solvent rather than as a plasticizer in coating compositions requiring a solvent of very low volatility. For this purpose, the ketones of this type are well suited because of their high solubility for the resins and their resistance towards water.

Ketones containing at least 12 carbon atoms per molecule are excellent substances for plasticizing nitrocellulose. Especially is this true of ketones prepared by condensing mesityl oxide and hydrogenating the condensation products. The good compatibility of the ketones for nitrocellulose as well as for numerous natural resins make the ketones very attractive and desirable substances for use in nitrocellulose lacquers.

Plasticized compositions containing a polyvinyl acetal and a ketone with 18 to 24 carbon atoms per molecule are materials suitable for use in laminated glass. Such compositions have good adhesion to glass, are water-white and light stable, have excellent resistivity towards water and retain these qualities over a broad range of temperatures. Qualities of such character are what are required for laminated glass and polyvinyl acetal resins plasticized with ketones which are hydrogenation products of condensed ketones and aldehydes are well suited for this purpose.

Another valuable composition of the invention is the interpolymers of vinyl chloride and vinyl acetate plasticized with the higher ketones. Compositions of this type are very suitable for coating food containers. The resin is resistant towards the majority of foodstuffs and when plasticized with the ketones, an odorless, tasteless composition is available which may be used as a protective coating for metal food containers.

Since such containers are often dented and given severe treatment it is essential that the coating be flexible and tough so that the film covering the metal will not be broken. Such a covering is afforded with compositions containing vinyl ester resins and ketones of the character described.

The compositions of the invention have numerous other uses. Many may be used for molding various valuable articles by methods well known to the art. The compositions may also be used to impregnate textiles, wood, paper, and the like and to insulate electrical devices, cable and wire. Some of the compositions are suitable for preparation of filaments, threads and fibers while others may be used to prepare films such as are used in photography, etc. An important application is in coating compositions for use as surface coverings such as lacquers, varnishes, enamels, and the like. For various special purposes to which the compositions may be put, it may be desirable to incorporate with them other ingredients such as dyes, fillers, pigments, other plasticizers, other resins, and the like. For preparing coating compositions various solvents may be used such as alcohols, esters, ketones, and hydrocarbons.

We claim as our invention:

1. A plasticized composition comprising a polyvinyl acetal resin plasticized with a branched chain, saturated ketone containing 18 to 24 carbon atoms which is obtained by hydrogenating a condensation product of mesityl oxide.

2. A plasticized composition comprising a polyvinyl acetal resin plasticized with a branched chain, saturated ketone containing 18 to 24 carbon atoms which is obtained by hydrogenating a ketone condensation product.

3. A plasticized composition comprising a polyvinyl ester resin plasticized with a branched chain, saturated ketone containing 18 to 24 carbon atoms which is obtained by hydrogenating a condensation product of mesityl oxide.

4. A plasticized composition comprising a polyvinyl ester resin plasticized with a branched chain, saturated ketone containing 18 to 24 carbon atoms which is obtained by hydrogenating a ketone condensation product.

5. A plasticized composition comprising nitrocellulose plasticized with a branched chain, saturated ketone containing 18 to 24 carbon atoms which is obtained by hydrogenating a condensation product of mesityl oxide.

6. A plasticized composition comprising nitrocellulose plasticized with a branched chain, saturated ketone containing 18 to 24 carbon atoms which is obtained by hydrogenating a ketone condensation product.

7. A plasticized composition comprising a ketone-soluble polyvinyl resin plasticized with a branched chain, saturated ketone containing 18 to 24 carbon atoms which is obtained by hydrogenating a ketone condensation product.

8. A plasticized composition comprising a ketone-soluble synthetic plastic plasticized with a branched chain, saturated ketone containing 18 to 24 carbon atoms which is obtained by hydrogenating a ketone condensation product.

FRANKLIN A. BENT.
FRANCIS G. BYRNE.